United States Patent [19]

White et al.

[11] Patent Number: 4,890,563
[45] Date of Patent: Jan. 2, 1990

[54] TREATMENT OF WASTE AND ROTARY KILN THEREFOR

[75] Inventors: Kenneth L. White, Kenmore; Harold B. Wight, Glen Waverley, both of Australia

[73] Assignee: Neutralysis Industries Pty. Ltd., Rocklean, Australia

[21] Appl. No.: 240,127

[22] PCT Filed: Oct. 2, 1987

[86] PCT No.: PCT/AU87/00338
§ 371 Date: May 20, 1988
§ 102(e) Date: May 20, 1988

[87] PCT Pub. No.: WO88/02284
PCT Pub. Date: Apr. 7, 1988

[30] Foreign Application Priority Data

Oct. 2, 1986 [AU] Australia ................ PH8282

[51] Int. Cl.⁴ ................ A47D 36/00; A47D 36/24
[52] U.S. Cl. ................ 110/246; 110/226; 110/238; 110/346; 432/106; 432/111
[58] Field of Search ............ 110/226, 246, 238, 346; 432/14, 106, 111

[56] References Cited

U.S. PATENT DOCUMENTS 1,895,159  1/1933  Greenawalt .
3,249,551  5/1966  Bixby et al. .
3,383,228  5/1968  Rekate et al. .
3,954,069  5/1976  Loken ................ 110/226 X
3,957,528  5/1976  Ott et al. .
4,112,033  9/1978  Lingl .
4,232,614  11/1980  Fitch et al. ................ 110/246 X
4,670,054  6/1987  Hohman et al. ................ 432/106 X

OTHER PUBLICATIONS

Hazardous Waste Management Techniques, p.p. 100-105

Primary Examiner—Edward G. Favors
Attorney, Agent, or Firm—Foley & Lardner, Schwartz, Jeffery, Schwaab, Mack, Blumenthal & Evans

[57] ABSTRACT

Method and apparatus for treating waste materials to produce aggregates wherein pellets comprised of a mixture of solids, liquid wastes and clay are dried by hot air in a dryer. The pellets are then fed to the pyrolysis zone of a rotary kiln wherein they are heated by hot gas from an oxidation zone of the kiln to drive off most of the volatile gases. Remaining volatile gases and the fixed carbon in the waste are oxidized in the oxidation zone, and the silicates in the clay are vitrified in a vitrification zone of the kiln to produce aggregates which are crushed and screened. Volatile gases given off from the pyrolysis zone are mixed with exhaust gases from the dryer to feed the burner for the vitrification zone and to supply oxygen to the oxidation zone.

18 Claims, 6 Drawing Sheets

TREATMENT OF WASTE AND ROTARY KILN THEREFOR

BACKGROUND OF THE INVENTION (1) Field of the Invention

This invention relates to a method of, and apparatus for, the treatment of waste. In particular, the apparatus preferably includes a rotary kiln.

(2) Prior Art

The disposal of urban solid waste and/or liquid wastes is a major problem facing modern man. Waste materials generally have a negative economic value and many toxic wastes are extremely difficult to neutralize or destroy.

Examples of waste treatment methods are disclosed in U.S. Pat. Nos. 1,859,159 (Greenwalt); 3,249,551 (Bixley); 3,383,228 (Rekate et al); 3,957,528 (Ott et al) and 4,112,033 (Linge).

SUMMARY OF THE PRESENT INVENTION

It is an object of the present invention to provide a method for the treatment of waste materials.

It is a preferred object to provide a method where the end product can be used as an aggregate, where the aggregate has a positive economic value e.g. for concrete production, road making or as porous fill.

It is a further preferred object to provide a rotary kiln suitable for the method.

Other preferred objects will become apparent from the following description.

In one aspect the present invention resides in a method for the treatment of waste materials including the steps of:

mixing solid and/or liquid wastes with a binding material;

passing the mixture through an extruder to form pellets of waste;

passing the pellets through a pyrolysis zone in a furnace or kiln to drive off at least portion of the volatile gases in the waste;

passing the pellets through an oxidation zone in the furnace or kiln where the excess oxygen causes the remaining volatile gases and at least a portion of the fixed carbon in the waste to be oxidized; and passing the pellets through a vitrification zone in the furnace or kiln to vitrify the silicates present in the pellets to form a solid aggregate.

The binding material will be selected on the basis that, when fired, it will form a hard inert ceramic material and may include clay, shale or similar material with suitable ceramic properties.

Preferably the pellets are passed through a dryer before they are fed to the furnace or kiln, the pellets preferably being dried by a counter-current flow of hot gas from at least one of the zones of the furnace or kiln.

Preferably the aggregate is cooled in a cooler by a flow of air, the air heated in the cooler preferably being fed to the dryer to dry the pellets.

The exhaust gas from the dryer is preferably split into two streams, one being fed to an afterburner and gas cleaning system, the second to the oxidation and/or vitrification zones of the furnace or kiln.

Preferably the pellets are heated to approximately 650° C. in the pyrolysis zone by the controlled burning of some of the volatiles driven off from the waste and by hot gases transferred from the oxidation zone, the resulting volatile-rich gas stream being used to fuel gas in the oxidation and/or vitrification zones. Some of the fuel gas may be supplied to the afterburner.

Preferably the oxidation of the pellets, to burn off the remaining volatiles and the fixed carbon solids, occurs in the oxidation zone at or below 1000° C., the oxidation and the combustion of some of the fuel gas from the pyrolysis zone providing the heat in the oxidation zone. A portion of the fixed carbon may be left in the pellets to promote bloating, which reduces the specific gravity (S.G.) of the final aggregate.

A portion of the exhaust air from the dryer may be fed to the oxidation zone by a pipe passing through the vitrification zone to supply oxygen to the oxidation zone.

Preferably the vitrification of the silicates occurs at 1200° C.±200° C. in the vitrification zone, the heat in the zone being generated by the the burning of fuel gas from the pyrolysis zone and by air from the dryer.

While it is preferred that the solids and gases in the kiln flow in counter-current direction, the gas flow in the oxidation and vitrification zones may be concurrent with the solids flow, where the exhaust gas from the dryer is fed to the oxidation zone. The hot gas is then fed to the vitrification zone and burn with some of the fuel gas from the pyrolysis zone to vitrify the solids. The gas from the vitrification zone is separated into two streams, one being directed to the pyrolysis zone to provide heat and oxygen for combustion in that zone, the other stream being directed to the gas cleaning system.

In a second aspect the present invention resides in a rotary kiln for treatment of waste including:

a pyrolysis zone to receive pellets of solid and/or liquid waste mixed with a binding material where the pellets are heated to drive off at least a portion of the volatile gases contained in the waste;

an oxidation zone where excess oxygen cause the remaining volatile gases and at least a portion of the fixed carbon in the waste to be oxidized; and a vitrification zone where silicates in the pellets are vitrified to form a solid aggregate.

In a third aspect the present invention resides in an apparatus for the treatment of wastes including:

a dryer for pellets of solid and/or liquid waste mixed with a binding material;

the rotary kiln hereinbefore described; and a cooler for the solid aggregate.

Other features of the apparatus will become apparent to the skilled addressee.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENT

Figure 1:
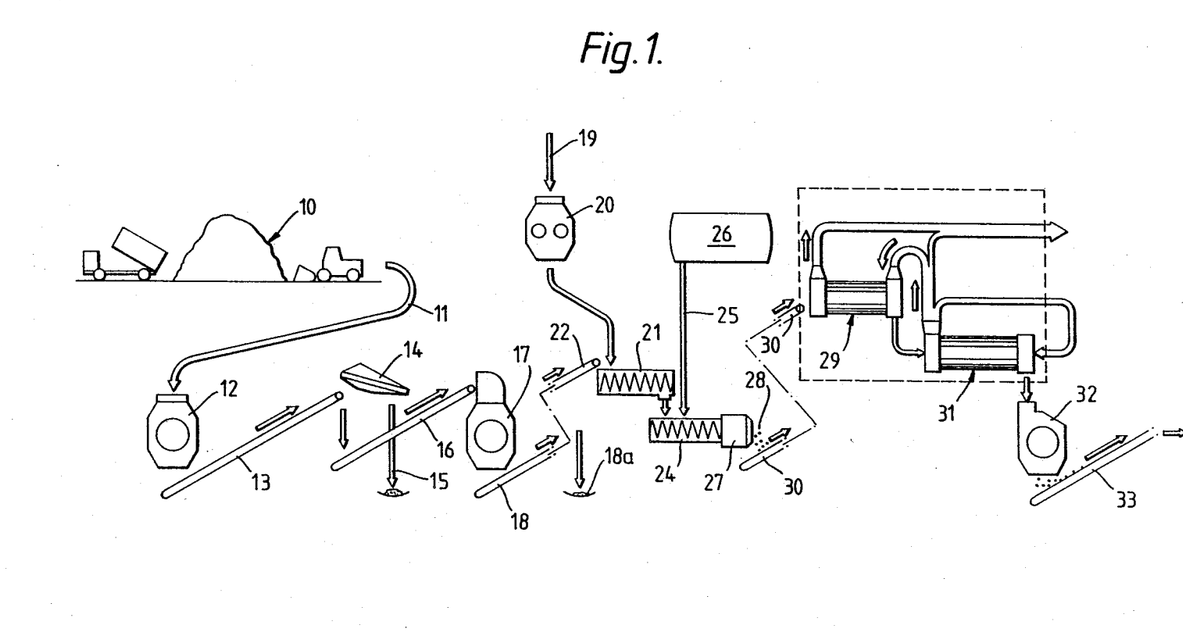
FIG. 1 is a schematic layout of a waste treatment plant.

Referring to FIG. 1, urban solid waste 10 is dumped in a receival pile and is fed as required by an apron feeder 11 to a primary pulverizer 12. The pulverized waste is transported via a conveyor 13 to a magnetic separator 14 which removes any steel components in the waste to a scrap steel bin at 15. The waste is transported by a conveyor 16 to a secondary pulverizer 17 and is ground to size before being transported to storage (not shown) by a conveyor 18. (The solid waste passes a secondary magnetic separator to remove any remaining metal to scrap at 18a.)

Clay 19 is crushed/hammermilled and screened in a processing unit 20 before being fed to a predryer/ premixer 21 where it is mixed with the solid waste transported from its store by a conveyor 22.

The dried pulverized solid waste/clay mixture is mixed in a mixer 24 with liquid waste 25 from a storage tank 26 and is fed to a pugmill 27 to produce pellets 28 which are conveyed to a dryer 29, to be hereinafter described in more detail, by a conveyor 30. The pellets are dried and then transported to the rotary kiln 31 to be fired, as hereinafter described. The resultant aggregate is cooled and then fed to a crushing and screening plant 32 before being fed to a stockpile (not shown) by a conveyor 33.

Figure 2:
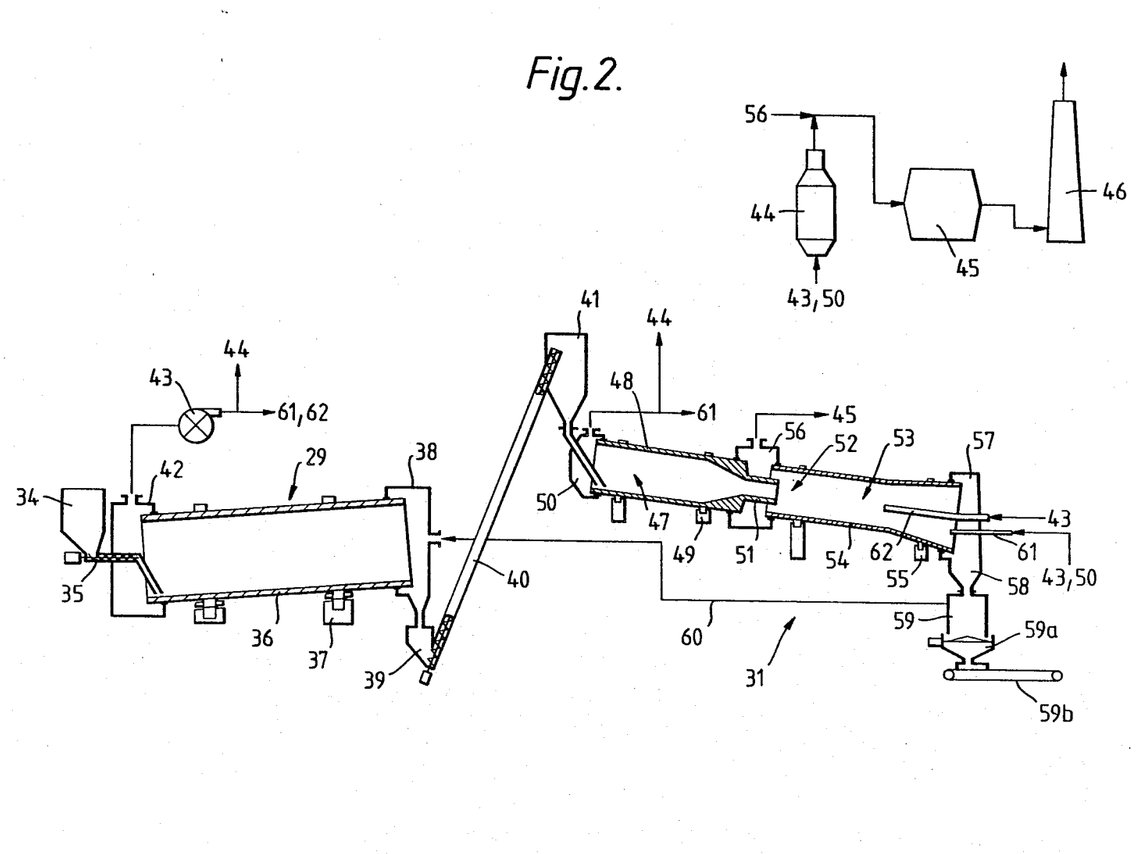
FIG. 2 is a schematic layout of a first embodiment of the rotary kiln of the present invention.

Referring now to FIG. 2, the pellets are conveyed by the conveyor 30 to a feed hopper 34 and are supplied to the rotary dryer 29 by a screw conveyor 35.

The dryer 29 has a drum 36 (with internal flights to convey the pellets upward for more efficient heat transfer) mounted on a rotary support structure 37. A hood 38 at the exhaust end receives hot dry gas which flows counter-current to the pellet flow to cause the latter to be dried. The hood has a discharge outlet 39 connected to a screw conveyor 40 which transports the dried pellets to a surge bin 41 at the inlet end of the kiln 31. An exhaust hood 42 at the inlet end of the dryer 29 receives the exhaust gas from the dryer being drawn off by a fan 43. The outlet of the fan is connected to an afterburner 44 and to rotary kilns as hereinafter described. The afterburner 44 is connected to a gas scrubber 45 and exhaust stack 46.

The pellets are fed from the surge bin 41 to the inlet end of the pyrolysis zone 47 of the rotary kiln 31.

The pyrolysis zone has a rotary tube 48 lined with refractory material (and lifters to improve heat transfer efficiency) and is mounted on a rotary support structure 49. A hood 50 is provided at the inlet end of the pyrolysis zone. The exhaust end of the zone has a reduced neck portion 51 co-axially received within the inlet end of the oxidation zone 52 of the kiln 31.

The oxidation and vitrification zones 52, 53 of the kiln 31 are formed by a second refractory-lined tube 54 mounted on a rotary support structure 55. The angles of inclination and the rotational speeds of the tubes 48, 54, and the neck portion 51, control the flow of the pellets and aggregate through the kiln.

A hood 56 surrounds the inlet end of the oxidation zone 52 (and the exhaust end of the pyrolysis zone 47) to receive exhaust gases from the oxidation zone 52.

A hood 57 surrounds the discharge end of the vitrification zone 53 and leads to a discharge chute 58 for the aggregate which directs the latter to an aggregate cooler 59 and then via the cooler discharge 59a and conveyor 59b to the crushing and screening plant 32.

Figure 5:
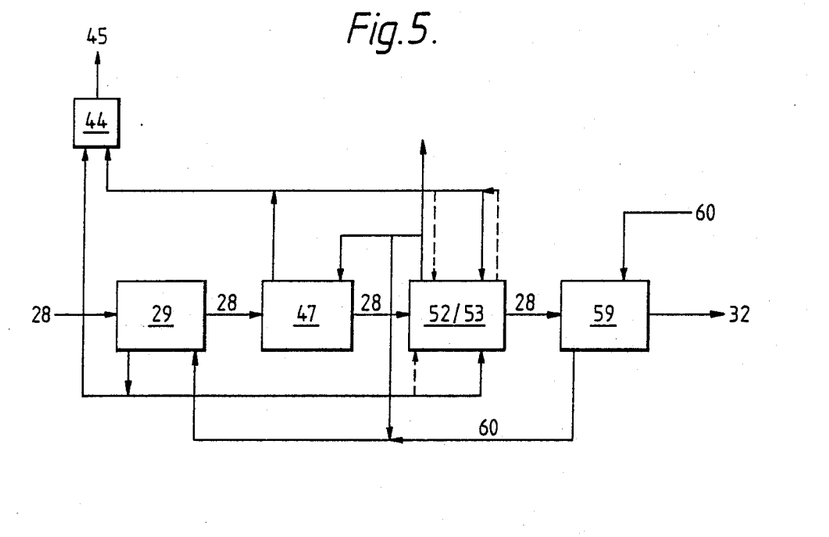
FIG. 5 is a schematic layout of the solids and gas flow.

The respective solids and gas flows will now be described with reference to FIG. 5.

A. Solids Flow

From the pugmill 27 the extruded pellets 28 enter the rotary drum dryer 29 (via screw conveyor 35) where most of the water in the pellets is removed. The water is evaporated into a hot air stream travelling countercurrently to the pellets. This hot air is generated by heating fresh air 60 by direct contact with hot aggregate product in the aggregate cooler 59, and its flow and temperature are regulated to achieve the required degree and rate of drying.

The pellets 28 pass from the dryer 29 by way of screw conveyor 40 into the surge bin 41 which acts as a buffer between the dryer 29 and the pyrolysis zone 47. Pellets are removed as required from the bin 41 into the pyrolysis zone. Here, carefully controlled burning of some of the volatiles in the pellets and heat transfer from the oxidation zone hot gas raises the solids temperature to approximately 650° C., enough to drive off most of the volatiles present. The resulting volatile-rich gas stream is drawn off via the hood 50 and is used as fuel gas elsewhere in the process. Any moisture remaining in the pellets is also driven off at this stage.

From the pyrolysis zone 47 the pellets pass into the oxidation zone 52. The pellets first enter the oxidation zone where they are contacted against excess oxygen, and the remaining volatiles and fixed carbon are oxidized. This oxidation along with combustion of some of the fuel gas from the pyrolysis zone 47 provides the heat to raise the solids temperature to approximately 1100° C.

The pellets then pass into the vitrification zone 53 of the kiln. Further fuel gas from the pyrolysis zone 47 is burnt here to bring the solids temperature up to 1200° C. ±200° C. This final heating stage brings about vitrification of silicates present in the pellets, conferring desirable physical properties on the aggregate produced.

The hot aggregate passes from the kiln directly into the vertical aggregate cooler 59 where it is cooled against a counter-current flow of fresh air 60.

B. Gas Flow

Fresh air 60 enters the aggregate cooler 59, where it absorbs heat from the hot aggregate. This hot air stream is introduced to the raw feed dryer (via hood 38), counter-current to the flow of pellets. In the dryer 29 this gas stream evaporates most of the water from the pellets, cooling as it does so. The flow and temperature of the gas is set to achieve optimum drying conditions.

The exhaust gas from the dryer is controlled by hood 42 and is split into two streams. A large portion goes directly into the afterburner 44 for burning prior to gas cleaning.

Gas and solids flow in a counter-current manner in the oxidation/vitrification zones of the kiln. A proportion of fuel gas generated in the pyrolysis section is fed to a burner 61 located in the vitrification zone 33 of the kiln and the remaining air from the dryer 29 is introduced into the oxidation and vitrification zones. Some of this air is fed to the fuel gas burner 61 in the vitrification zone where gas temperatures are increased and some of the heat given up raising the solid temperatures to that required for vitrification. The remaining air introduced to the oxidation/vitrification zones is fed to the oxidation zone 52 through a pipe 62 running down the centre of the vitrification zone 53. The air is preheated in this pipe 62 and on delivery to the oxidation zone 52 supplies the oxygen required for combustion of the remaining volatiles and fixed carbon in the pyrolysed pellets thereby releasing sufficient heat to raise the solids from the pyrolysis zone temperature to that required for oxidation. Hot gas leaving the oxidation zone 52 is in part returned to the pyrolysis zone 47 via the neck portion 51 counter-current to the pellet flow from the pyrolysis zone 47 to the oxidation zone 52 to provide heat and oxygen for combustion in that section of the process.

This stream is controlled to allow a small fraction of the volatiles present in the pellets to be burnt. The heat released by combustion and heat transfer from the hot oxidation zone gas raises the solids temperature sufficiently to drive off most of the volatiles present into the gas stream, in the pyrolysis zone. The resulting oxygen free, volatile-rich gas stream from this pyrolysis zone 47 is discharged from hood 50 and is used as fuel gas in the vitrification zone 53 and the afterburner 44.

The remainder of the off gas from the oxidation zone (i.e. not going to pyrolysis) passes through the hood 56 directly to the gas scrubber 45.

C. Alternative Gas Flow (as shown in dashed lines in FIG. 5)

As an alternative to the above, the gas flow in the oxidation/vitrification zones 52/53 can be cocurrent instead of counter-current to the solids flow. In this case the air returning to the process from the dryer 29 is introduced into the oxidation zone 52 of the kiln. Here it allows the combustion of remaining volatiles and the fixed carbon in the pyrolysed pellets and absorbs that heat generated that is not taken up by the solids. The hot gas then passes into the vitrification zone 53 where its temperature is further increased by burning a portion of the fuel gas from the pyrolysis zone 47. Some of this heat is given up to bring the solids up to vitrification temperature. Gas leaving the vitrification zone 53 is in part returned to the pyrolysis zone 47 to provide heat and oxygen for combustion in that section of the process. The remainder of the gas is discharged from the plant via hood 57 to the gas scrubber 45.

Figure 6A:
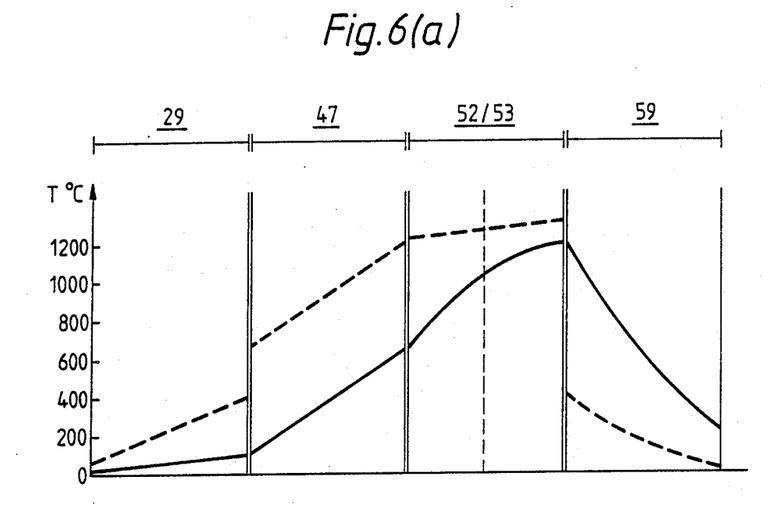
FIG. 6(a) is a graph of the solid and gas temperatures in the dryer and the pyrolysis, oxidation/ vitrification zones of the kiln and the cooler.
Figure 6B:
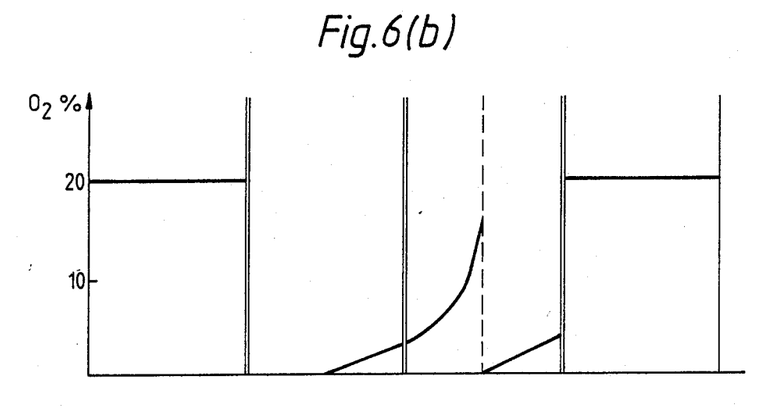
FIG. 6(b) is a graph of the oxygen ($O_2$) content in the dryer and the pyrolysis, oxidation/ vitrification zones of the kiln and the cooler.

The temperature of the waste and of the gases in the dryer 29, pyrolysis zone 47, oxidation/vitrification zones 52, 53 and the cooler 59 are shown in solid and dashed lines respectively in FIG. 6(a) while the oxygen ($O_2$) content in the above is shown in FIG. 6(b).

Figure 3:
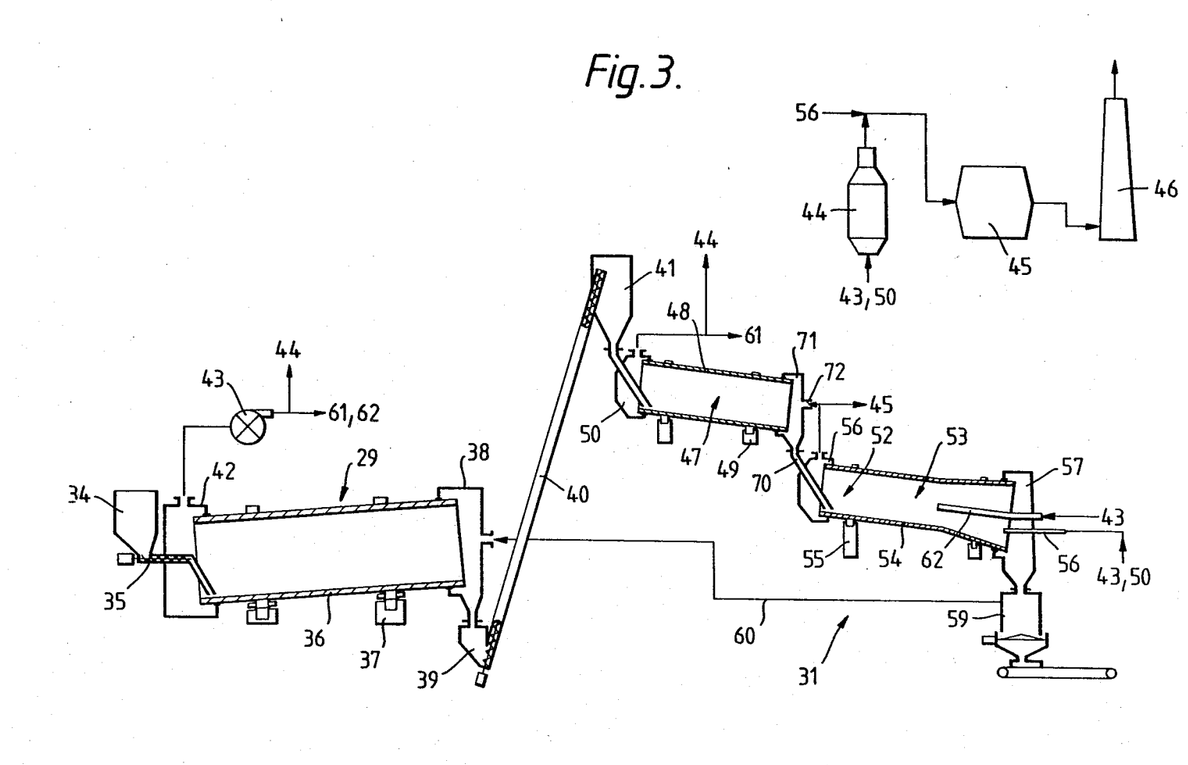
FIG. 3 is a schematic layout of a second embodiment of the rotary kiln.

Referring now to FIG. 3, the layout of the rotary kiln is generally the same as for FIG. 2, except that the pyrolyzed pellets are transported from the exhaust end of the pyrolysis zone 47 to the inlet end of the oxidation zone 52 by a tube 70 passing through the hood 56 and where exhaust gas from the oxidation zone is fed to hood 71 at the exhaust end of the pyrolysis zone via an inlet pipe 72.

Figure 4:
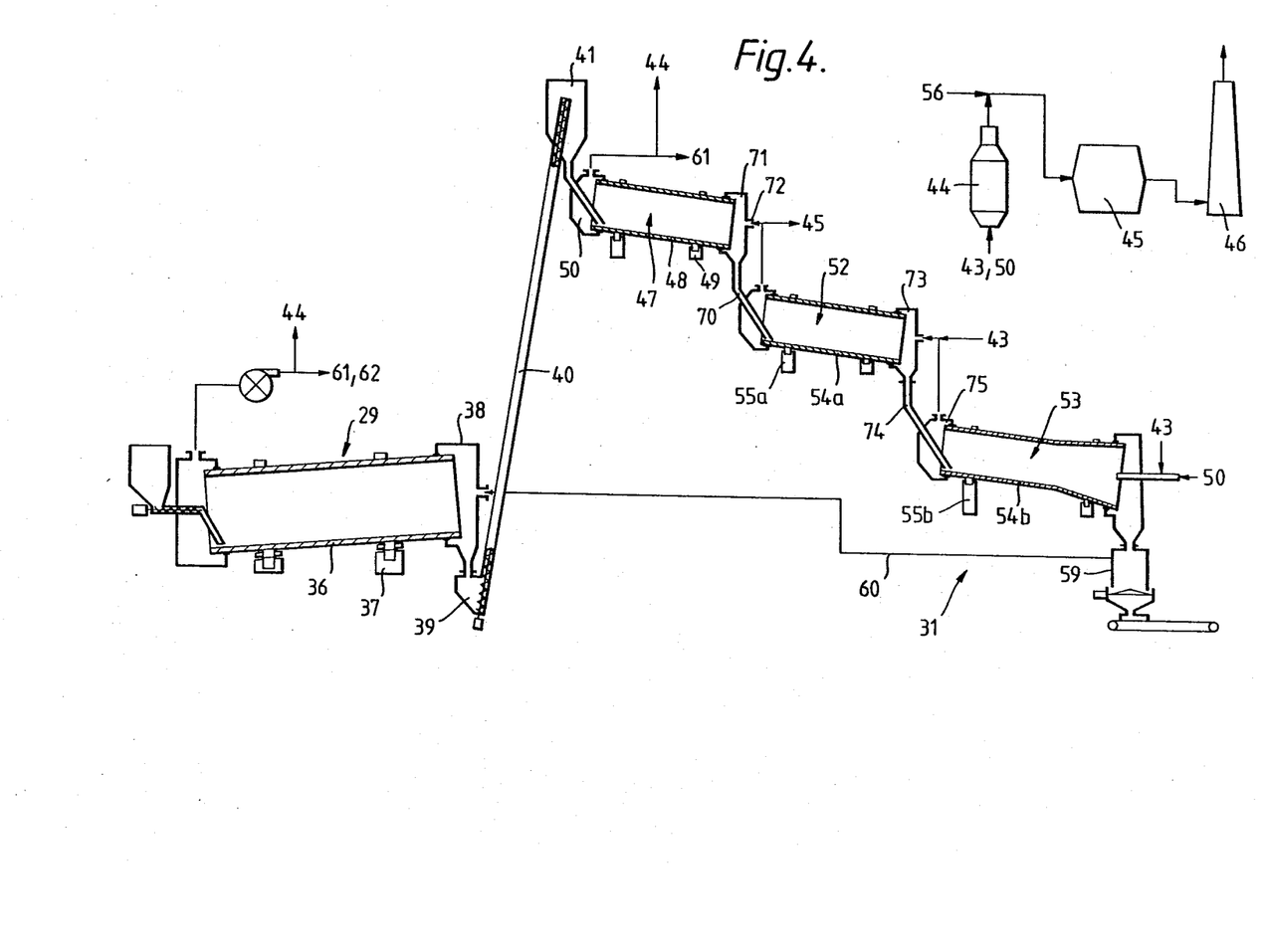
FIG. 4 is a schematic layout of a third embodiment of the rotary kiln.

In the embodiment of FIG. 4, the oxidation and vitrification zones 52, 53 are provided in respective refractory-lined tubes 54a, 54b mounted on respective rotary supports 55a, 55b. The oxidized pellets are conveyed from the exhaust end of the oxidation zone 52 to the inlet end of the vitrification zone 53 via a hood 73 and discharge chute 74, the latter being received in a hood 75 in the vitrification zone.

The hot gases from the vitrification zone 53, through duct 43, are mixed with some of the exhaust gases from the dryer 29 and fed into the oxidation zone 52, thereby eliminating pipe 62 through the vitrification zone 53.

As will be readily apparent to the skilled addressee, the process variations provide the potential customer with a range of options from which to choose.

The aggregate can be used for concrete production, road making or high grade porous fill.

Variations and modifications may be made to the embodiments described without departing from the present invention as defined in the appended claims.

We claim:

1. A method for the treatment of waste materials including the steps of:
   mixing solid and/or liquid wastes with a binding material;
   passing the mixture through an extruder to form pellets of waste;
   passing the pellets through a dryer, and directing a countercurrent flow of hot gas through said drying from at least one of the zones of a kiln located downstream of said dryer;
   passing the pellets through a pyrolysis zone in the kiln to drive off at least a portion of the volatile gases in the waste;
   passing the pellets through an oxidation zone in the kiln where the excess oxygen causes the remaining volatile gases and at least a portion of the fixed carbon in the waste to be oxidized;
   passing the pellets through a vitrification zone in the kiln to vitrify the silicates present in the pellets to form a solid aggregate, and wherein
   exhaust wherein gas from said dryer is split into two streams, at least one of the streams being fed to the oxidation and/or vitrification zones of the kiln.

2. A method for the treatment of waste materials including the steps of:
   mixing solid and/or liquid wastes with a binding material;
   passing the mixture through an extruder to form pellets of waste;
   passing the pellets through a pyrolysis zone in a kiln to drive off at least a portion of the volatile gases in the waste;
   passing the pellets through an oxidation zone in the kiln where the excess oxygen causes the remaining volatile gases and at least a portion of the fixed carbon in the waste to be oxidized;
   passing the pellets through a vitrification zone in the kiln to vitrify the silicates present in the pellets to form a solid aggregate, and wherein
   the pellets are heated to approximately 650° C. in the pyrolysis zone to drive off the volatile gases, the pyrolysis zone being heated by the combustion of at least a portion of the volatile gases and by hot gases from the oxidation zone.

3. A method for the treatment of waste materials including the steps of:
   mixing solid and/or liquid wastes with a binding material;
   passing the mixture through an extruder to form pellets of waste;

passing the pellets through a pyrolysis zone in a kiln to drive off at least a portion of the volatile gases in the waste;

passing the pellets through an oxidation zone in the kiln where the excess oxygen causes the remaining volatile gases and at least a portion of the fixed carbon in the waste to be oxidized;

passing the pellets through a vitrification zone in the kiln to vitrify the silicates present in the pellets to form a solid aggregate, and wherein the remaining volatile gases and the fixed carbon are combusted at below 1,000° C. in the oxidation zone, the oxidation zone being heated by the oxidation of the volatile gases and the fixed carbon by some of the volatile gases from the pyrolysis zone supplied as fuel gas to the oxidation zone.

4. A method for the treatment of waste materials including the steps of:

mixing solid and/or liquid wastes with a binding material;

passing the mixture through an extruder to form pellets of waste;

passing the pellets through a dryer;

passing the pellets through a pyrolysis zone in a kiln to drive off at least a portion of the volatile gases in the waste;

passing the pellets through an oxidation zone in the kiln where the excess oxygen causes the remaining volatile gases and at least a portion of the fixed carbon in the waste to be oxidized;

passing the pellets through a vitrification zone in the kiln to vitrify the silicates present in the pellets to form a solid aggregate, and wherein silicates in the pellets are vitrified at 1,200° C.±200° C. in the vitrification zone, the heat in the vitrification zone being provided by combustion of the volatile gas from the pyrolysis zone supplied as fuel gas to the vitrification zone and from the exhaust gases from the dryer supplied as combustion air.

5. A method for the treatment of waste materials including the steps of:

mixing solid and/or liquid wastes with a binding materials;

forming pellets of waste material from said mixture;

passing the pellets through a pyrolysis zone in a kiln to drive off at least a portion of the volatile gases in the waste;

passing the pellets through an oxidation zone in the kiln where the excess oxygen causes the remaining volatile gases and at least a portion of the fixed carbon in the waste to be oxidized;

passing the pellets through a vitrification zone in a furnace or kiln to vitrify the silicates present in the pellets to form a solid aggregate, and wherein the volatile gases from the pyrolysis zone are used a fuel gas for combustion in the oxidation and/or vitrification zones.

6. A method according to claim 5 wherein:

the pellets are passed through a dryer upstream of the kiln, the pellets being dried by a countercurrent flow of hot gas from at least one of the zones of the kiln.

7. A method according to claim 6 wherein:

the aggregate is cooled in a cooler by a flow of air, the heated air exhausted from the aggregate cooler being fed to said dryer in a countercurrent flow to the pellets.

8. A method according to claim 5 wherein:

the binding material is clay, shale or similar material which, when fixed, forms a hard ceramic material.

9. A method according to claim 5 wherein:

the flow of the pellets and gases in the pyrolysis zone are countercurrent, and the flow of the pellets and the gases in the oxidation and vitrification zones are countercurrent or concurrent.

10. The method according to claim 5 wherein:

said pellets are heated in said pyrolysis zone to approximately 650° C., are heated in said oxidation zone to approximately 1,000° C., and are vitrified in said vitrification zone at approximately 1,200° C.±200° C.

11. A rotary kiln for treatment of waste materials, comprising:

means defining a pyrolysis zone adapted to receive pellets of solid and/or liquid waste mixed with a binding material, and means for heating said pellets in said zone to drive off at least a portion of the volatile gases contained in the waste;

means defining an oxidation zone downstream of said pyrolysis zone in which an excess oxygen environment causes the remaining volatile gases and at least a portion of the fixed carbon in the waste to be oxidized;

means defining a vitrification zone downstream of said oxidation zone in which silicates in the pellets are vitrified to form a solid aggregate, and means for delivering said volatile gases formed in said pyrolysis zone to said oxidation and vitrification zones to be used as fuel gas therein, said fuel gas supplying the fuel for the process.

12. A rotary kiln according to claim 11 wherein:

said means defining said pyrolysis zone comprises a first refractory lined tube;

said means defining said oxidation and vitrification zones comprising a second refractory lined tube; and wherein said first tube is formed with a neck portion which controls both the flow of pellets from the pyrolysis zone to the oxidation zone and the countercurrent flow of hot gas from the oxidation zone to the pyrolysis zone to provide heat and oxygen for combustion in said pyrolysis zone.

13. The apparatus of claim 12 further including a dryer upstream of said pyrolysis zone, means for drying pellets conveyed to said dryer, and a cooler downstream of said vitrification zone for cooling the solid aggregate.

14. Apparatus according to claim 13 wherein:

hot gas from at least one of the zones of the kiln and/or hot air from the cooler is fed to the dryer in countercurrent flow to the flow of pellets in the dryer.

15. The apparatus of claim 11 wherein said means for heating said pyrolysis zone comprises hot gases delivered to said pyrolysis zone from said oxidation zone.

16. The apparatus of claim 14, further including:

means for delivering volatile fuel gas from said pyrolysis zone to said vitrification zone for combustion therein, and means for delivering a portion of the exhaust gases from the dryer for combustion in said vitrification zone.

17. The apparatus of claim 12 wherein said first and second tubes are inclined downwardly for gravity feed of said pellets, and are independently rotated about their longitudinal axes.

18. The apparatus of claim 11 wherein said means for delivering said volatile gases from said pyrolysis zone to said oxidation and vitrification zones comprises a first burner located adjacent the discharge end of said vitrification zone, and a second burner extending through said vitrification zone into said oxidation zone.

* * * * *